Sept. 9, 1924.  
J. R. GRIFFITH  
1,507,672  
STEERING WHEEL MECHANISM FOR AUTOMOBILES  
Filed Oct. 11, 1921  
2 Sheets-Sheet 1
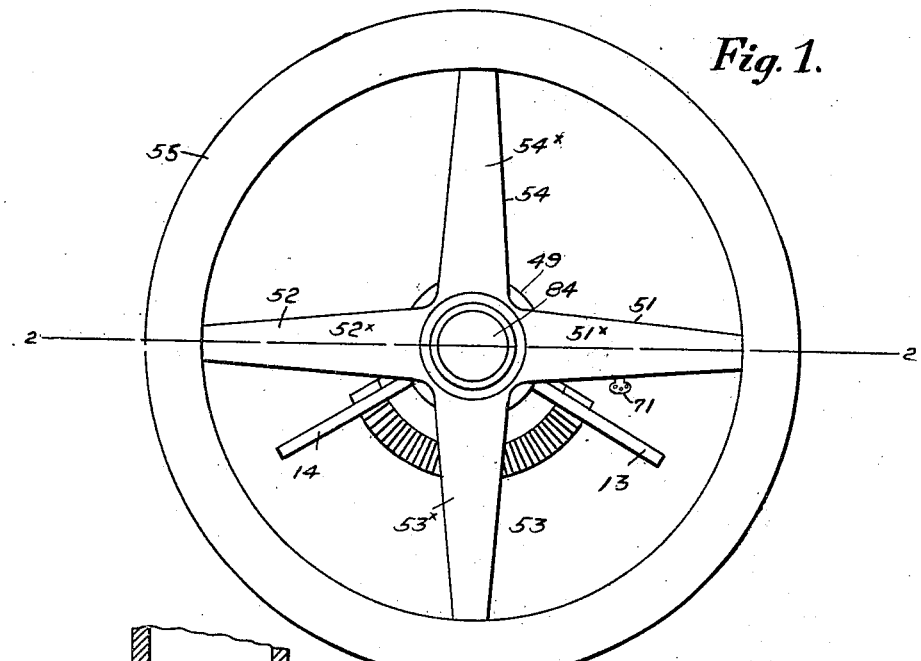
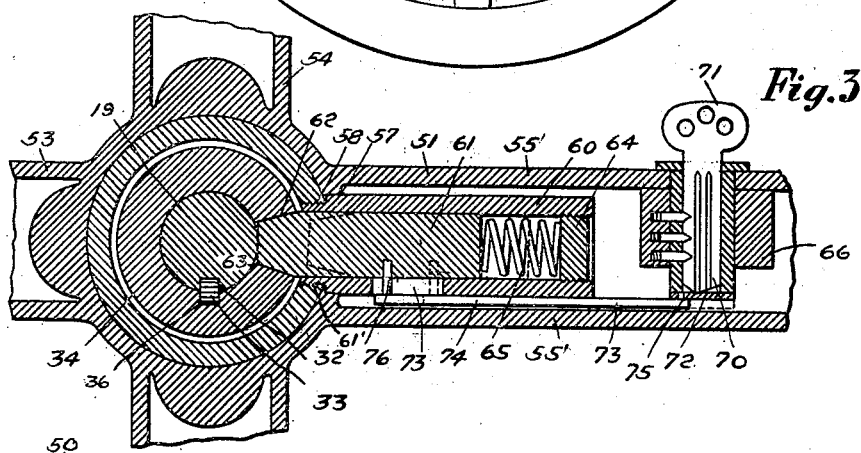
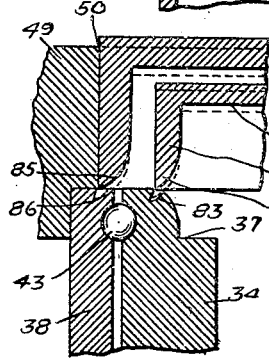
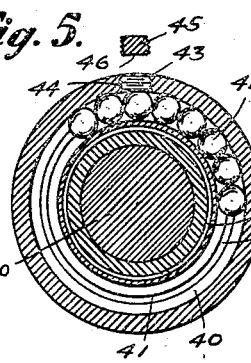
INVENTOR  
Jacob R. Griffith  
BY  
Richard Manning  
ATTORNEY Sept. 9, 1924.
J. R. GRIFFITH
1,507,672
STEERING WHEEL MECHANISM FOR AUTOMOBILES
Filed Oct. 11, 1921
2 Sheets-Sheet 2
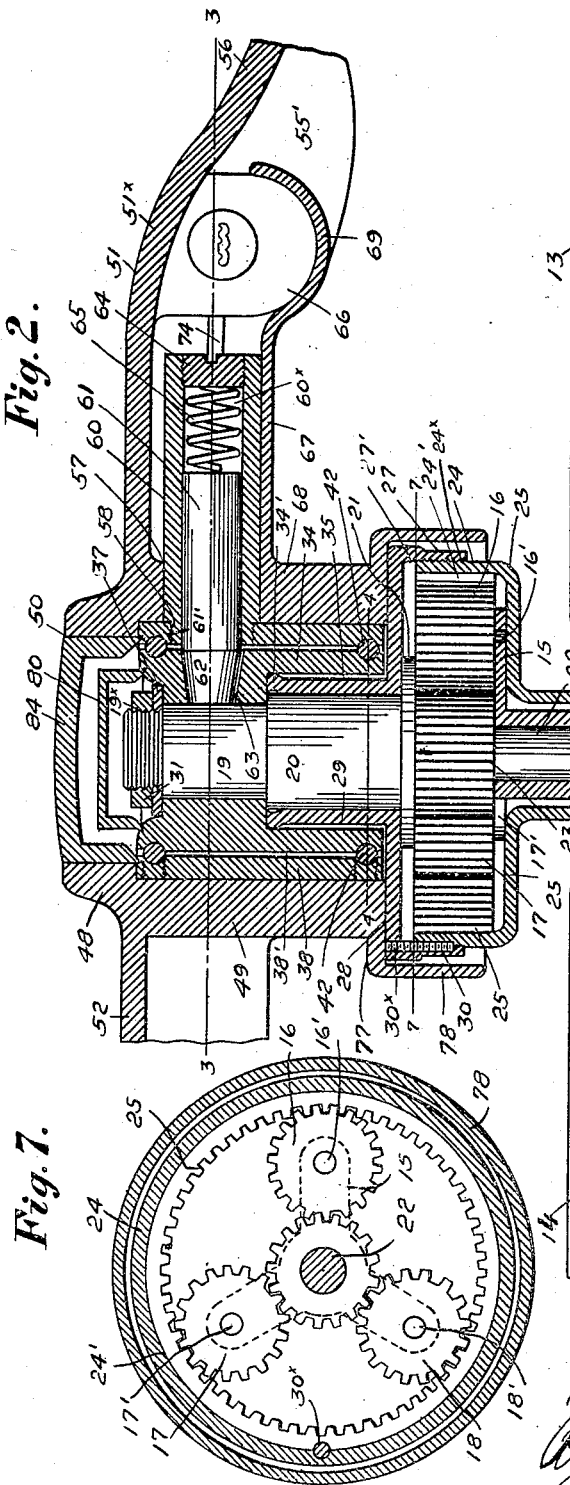
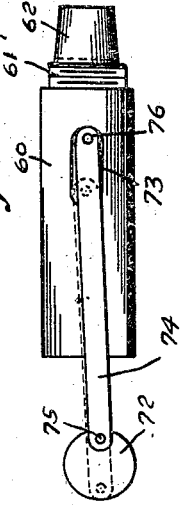
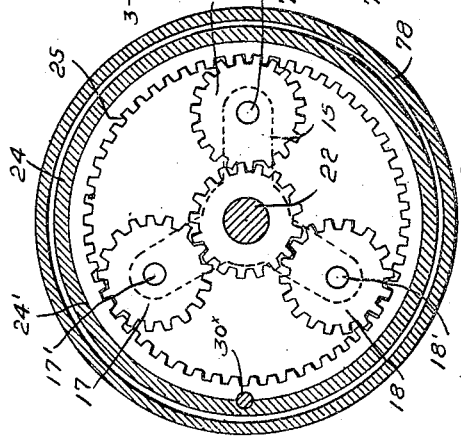
INVENTOR
Jacob R. Griffith
BY
Richd N Manning
ATTORNEY Patented Sept. 9, 1924.

1,507,672

UNITED STATES PATENT OFFICE.

JACOB R. GRIFFITH, OF KANSAS CITY, MISSOURI.

STEERING-WHEEL MECHANISM FOR AUTOMOBILES.

Application filed October 11, 1921. Serial No. 507,015.

*To all whom it may concern:*

Be it known that I, JACOB R. GRIFFITH, a citizen of the United States of America, residing at Kansas City, in the county of Jackson and State of Missouri, have invented certain new and useful Improvements in Steering-Wheel Mechanism for Automobiles; and I do hereby declare that the following is a full, clear, and exact description of the invention, reference being had to the accompanying drawings, forming a part of this specification.

The invention has for its object—

First: Means for preventing the surreptitious removal of means of protection positioned within an unlocked steering wheel and the subsequent starting of the automobile by substitute devices.

Second: Means for preventing the surreptitious removal of the gear enclosing shell on the steering shaft for starting the car by thieving operators.

Third: Means whereby the locked position of the locking bolt controls the locking key and Fourth: Means whereby the locked and unlocked positions of a locking bolt is contingent upon a dead center through key tumbler.

The invention consists in the novel construction, and combination of parts such as will be first fully described and then specifically pointed out in the claims.

In the drawings—

Figure 1 is a plan view of the steering wheel of an automobile in position on the steering spindle mechanism showing the gas feed and spark ignition levers on the steering post.

Figure 2 is a vertical sectional view of the steering wheel and locking parts mounted on the upper end of the actuating spindle to the steering mechanism, showing the novel locking parts and also showing the gear casing in section and the gear on the steering shaft of an automobile and the novel means for their protection and also showing the upper end portion of the steering post and gas and spark ignition levers, the view being taken on line 2—2 in Fig. 1, the lock casing being in full lines showing the key hole.

Figure 3 is a horizontal sectional view taken on the line 3—3 on Fig. 2, looking upwardly and the upper part reversed in position.

Figure 4 is a transverse sectional view of the spindle supporting the steering wheel and locking sleeve taken on line 4, 4, on Fig. 2.

Figure 5 is a detail sectional view of portions of the separate caps at the hub of the steering wheel showing the engaging means with the locking sleeve.

Figure 6 is a detail side view of the locking bolt showing the locking tumbler and crank arm and the locking and unlocking positions of the arm on dead centers.

Figure 7 is a horizontal sectional view taken on line 7—7 on Figure 2 showing the gear pinions, and Figure 8 is a detail perspective view of the lock cylinder carried by the steering wheel.

Similar numerals of reference indicate corresponding parts in all the figures of the drawings.

Referring to the drawings, 10 indicates the steering shaft to an automobile and 12 the ordinary stationary post upon an automobile through which the steering shaft extends. 13 and 14 represent the gas feeding and spark ignition levers which operate the admission of the liquid fuel to the carburetor and effect the ignition of the mixture within the engine cylinders in the usual manner.

Upon the upper end of the steering shaft 10, which is hollow, is located the mechanism commonly employed to impart rotary motion to said shaft and is particularly characteristic of the class of automobile styled the "Ford" automobile, the particular features of which mechanism will first be described.

Upon the upper end of the steering shaft 10 is formed integral therewith a series of radial plates 15, see Fig. 7, which support the planetary train of gear 16—17 and 18, each gear having a pivot post 16', 17', 18' respectively, connected rigidly with the said radial plates 15 near their outer edges.

Upon the steering gear driving spindle 19 is a sleeve 20, shrunk on said spindle so as to form an immovable part and on the lower portion of said sleeve is a circular flange or plate 21. Beneath the circular plate or flange 21 the spindle 19 is reduced in circumference at 22 and upon said part of the spindle is secured rigidly a small pinion gear wheel 23, which engages with each gear wheel 16—17 and 18 and imparts rotation thereto.

The said reduced portion 22 of the spindle extends downwardly within the upper end of the hollow steering shaft 10, of the automobile.

The circular plate 21, extends outwardly from sleeve 20 part way over each gear wheel, 16—17—18 and holds them in place upon their respective pivot posts.

Extending around the gear 16—17 and 18 is a circular plate 24 upon the inner surface of which are gear teeth 24' engaging with the teeth of the respective gear wheels.

With the lower portion of the plate 24, is connected integrally the outer upwardly curved portion 25' of a circular plate 25 which extends horizontally and inwardly beneath the series of plates 15, supporting the gear wheels 16—17 and 18 to within a short distance of the steering shaft 10, and is connected rigidly with the upper end of a sleeve 26, extending around the said shaft 10, and downwardly a short distance within the post 12. This plate forms the lower part of the gear casing. The circular plate 24 is externally screw threaded at 24ˣ and fitted thereto is the downwardly extended circular flange 27 on the horizontal circular cap plate 28, this flange being internally screw threaded at 27', and which engages with the screw threads 24ˣ on the circular plate 24 extending around the gear 16—17 and 18.

The inner portion of the circular cap plate 28 is connected integrally with the lower portion of a sleeve 29 extending closely around the sleeve 20, on the spindle 19 and upwardly the height of said sleeve 20.

The screw cap 28 which forms the upper part of the gear casing is connected fixedly with the flange 24, by the lower part by the screw 30, which extends downwardly within a screw threaded opening 30ˣ in the cap plate 28, and thence within the screw threaded portions of the flanges 24 and 27 of the said gear casing.

The upper end of the spindle 19 is reduced in circumference and screw threaded at 19ˣ and upon said end is fitted the nut 31.

In the rear portion of the spindle 19 is a vertical groove 32, see Fig. 3.

In the attachment of the steering wheel to the spindle 19 in the ordinary manner the key 33 secures said wheel fixedly to the spindle, and in actuation of the wheel the spindle communicates motion to the respective gear wheels 16—17 and 18, and this motion is transmitted through the series of plates 15, to the steering shaft 10 to govern the direction of movement of the automobile, the steering wheel being affixed to the spindle 19.

In carrying out my invention a sleeve 34 is made of considerable thickness to extend around the spindle 19, its lower inner portion being recessed from the slight outward projection 34', on the upper end of sleeve 29, downwardly and outwardly beneath its lower end and the upper surface of cap plate 28 to form an annular space 35. This sleeve 34 which forms a locking sleeve is provided with a vertical groove 36, see Fig. 3, by means of which the key or spline 33 secures the sleeve 34 rigidly to the spindle 19.

The upper portion of sleeve 34, which extends upwardly nearly to a position horizontal with the upper surface of the nut 31 is recessed at 37 to receive said nut.

Around the sleeve 34 extends an independently movable sleeve 38, between which and the outer surface of sleeve 34 is formed an annular space 38', slightly wider than the space 35, between the sleeves 29 and 34.

At the upper and lower ends of the locking sleeve 34, and sleeve 38, and in opposing surfaces are anti friction ball races, the race at the lower end being shown in Fig. 4, consisting of a groove 40 in the inner surface of the sleeve 38, and a groove 41 in the face of the sleeve 34 these grooves opposing surface of sleeve 34 these grooves being in opposite position and concentric with the inner surfaces of said sleeves.

Within said races or grooves are a series of anti friction balls 42. These balls hold the sleeves 34 and 35 when the assembled parts of the wheel are together from removal.

In the upper portion of these sleeves 34 and 38 are like grooves in which are the anti friction rollers 42.

In order to introduce the anti friction balls within the grooves 40 and 41, an opening 43 is formed in the casing 38 from the outer surface inwardly to groove 40 slightly larger in circumference than the ball 42 and through which opening the balls are introduced one by one to the groove.

The opening 43 is screw threaded at 44, and within said opening is fitted a screw plug 45, the inner end of which plug is curved at 46 to correspond with the curved surface of the groove 40 in the sleeve 38. Hence for two purposes the ball race is unobstructed and the balls inserted and removed with great facility and also lubricated. 48 indicates the steering wheel of the invention which consists of a hub 49 of considerable thickness in the apex of which hub is a circular opening 50, which extends downwardly to the line of the upper ends of the sleeve 34 and 38.

Arms 51 and 52 extend radially from the hub 49 and hub in one axial line of the hub 49 and arms 53 and 54 at right angles to said line and are rigidly connected at their outer ends with the rim member 55, of the wheel.

Each arm consists of a metal top plate 51ˣ,

52ˣ, 53ˣ, 54ˣ respectively which are narrow in width and from the outer edges of which depend the side flanges 55', 55' the outer end of each arm being curved at 56, downwardly in a slight degree. As shown the inner end portions of the arms and flanges are formed integrally with the hub 49. In the hub 49 is a circular opening 57, the opening being between the flanges 55' of arm 51, a short distance below the line of the lower surface of the top member 51ˣ. In the outer sleeve 38, opposite the opening 57 in the hub 49, is a screw threaded opening 58.

60, indicates a bolt casing which consists as shown of a cylindrical tube of the size of the opening 57 in the hub, in the inner end of which casing is reduced in circumference and externally screw threaded at 61', and said end inserted within the opening 57 in the hub and fitted within the screw threaded opening 58, in the outer sleeve 38. In the cylindrical opening 60ˣ in the tube 60, is a sliding bolt 61, having a conical locking head 62 at its outer end.

In the inner sleeve 34 is a cone shaped opening 63, which registers with the opening 60ˣ in the tube casing 60, and is adapted to receive the cone shaped outer end of the locking bolt 61 and holds the steering wheel in a locked position.

The rear end of the bolt casing 60, is internally screw threaded, and within said end is fitted a screw threaded plug 64. Within the casing 60, and in rear of bolt 61, is a spiral spring 65, one end of said spring bearing against the inner end of the bolt, and the other end against the plug 64.

Connected rigidly with the lower surface of the top member 51ˣ of the arm 51, a short distance outwardly from the outer end of the bolt casing 60, is the lock casing 66, of an ordinary lock such as the Yale lock. A detachable plate 67 is rigidly connected at its inner downwardly bent end 68 by brazing with the outer surface of the hub 49, and its outer end extended in the direction of the lock casing 66 and curved at 69 upwardly beneath said casing. This plate is removed for the purpose of assembling the locking parts.

70 indicates the key cylinder, see Fig. 3, within which is shown for illustration the key 71, in a position relatively to the locked position of the locking bolt 61, the outer end of which cylinder extends a short distance outwardly from the locking casing 66 and with said end is connected rigidly a circular plate 72.

In the side of the bolt casing 60, a short distance outwardly from the line of the hub 49 is a longitudinal opening 73, see Fig. 3.

74 indicates a controlling bar or lever to the bolt, one end of which bar is pivoted at 75 to the plate 72, and the other end of said bar is pivoted to a pin 76, which pin extends within the opening 73, in the bolt casing, and is rigidly connected with the bolt, see Fig. 3.

The pivotal connection of the bar 74, with the bolt is such that when the bolt is in a locked position the pivotal end of the bar is upon a dead centre with the cylinder, and at the end of its circle of rotation with the inward movement of the bolt, hence the key 71 is locked and cannot be removed until the bolt is unlocked. In the locked position of the locking bolt 61, the spring 65, has exerted its energy to throw the bolt and in the unlocked position the rotary movement of the lock cylinder reverses the movement of the bar 74, compressing the spring 65, and upon reaching the dead center upon the reverse movement of said bar, holds the spring under high compression and the bolt is nonacting as seen in dotted lines in Fig. 3.

With the hub 49 and integral therewith is a circular offset 77, at its lower end, and from said offset extends outwardly and downwardly a shield to the casing enclosing the planetary gearing consisting of circular flange 78, which extends past the circular flange 27, on the circular plate 21, of the upper casing to the gear mechanism to a position opposite the curved plate 24, forming the lower half of the casing enclosing said gearing, thereby fully protecting the upper half of the casing on the sleeve 20, from removal by surreptitious means.

In the opening 50 in the upper portion of the hub 49, is inserted a small protecting cap 80 to the nut 81 on the spindle 19. This cap is circular in form, the side member or flange 82 having an outwardly extended curved edge which forms a sharp mushroom edge at the line of the outer surface of said flange. In the upper surface of the sleeve 34, is a depression or groove 83 concentric with said lower edge of the flange 81, of the cap, hence when the cap 80 is given a sharp blow the lower curved edge 82 thereof enters said depression 83, and is firmly held from removal, see Fig. 5.

Above the cap 80, is a like cap 84, the downwardly extended flange of which is exactly fitted to enter said opening 50 in the hub, its lower edge having the outwardly curved mushroom portion 85, similar to the portion 82, on cap 80, and which enters a depression 86, in the upper end of the sleeve 38, within the hub 49, thereby preventing surreptitious means for operating the spindle of the steering mechanism completely.

When the locking bolt 61, is disengaged from the inner sleeve 34, the key 71 may be withdrawn from the lock and the steering wheel may be rotated freely on the sleeve 34, which are protected with the ball bearings.

When the steering control of the steering mechanism is desired the key 71 is placed in the cylinder 70, and the wheel rotated the proper direction to bring the opening 63 into position opposite the inner end of the bolt 61. The key 71 is then turned so as to raise the outer end of the controlling bar 74 above the dead center of the key cylinder and the spring 65 is ready to act and as soon as the opening 63 comes opposite the end 62 of bolt 61, the bolt enters said opening and the wheel is locked to the inner sleeve 34, which is within the hub 49, the key 71 being held within the key cylinder from removal, so that should the automobile be left while the wheel is locked, no protection is afforded the careless driver, but coincident with the unlocking of the wheel the driver has the key of the lock, which is a sure preventive of any attempt to lock the wheel by a false key.

Such modifications may be employed as is within the scope of the appended claims.

Having fully described my invention what I now claim as new and desire to secure by Letters Patent is, 1. In an automobile, and in combination with its steering mechanism, and steering wheel, and with the hub of said wheel having an opening therein, and with separate sleeves in said opening, and with means for locking and unlocking the said wheel with the separate sleeves, of self retaining closures for the opening in the hub attachable to said sleeves.

2. In an automobile, and in combination with the steering mechanism, and its actuating spindle, of a steering wheel and its hub, having an opening therein, and separate sleeves in said opening having depressions in their upper surfaces, one of which sleeves is keyed to said spindle, and locking means to both sleeves and caps within said opening in said hub having flanges, adapted to be retained within the depression in said sleeve.

3. In a device of the character described a steering mechanism, the steering wheel having a hub, a bolt casing carried by said hub and having a longitudinal slot, a lock carried by said wheel, a sliding bolt in the said casing, a pin fixed to said bolt and extending through said slot, and a connection between said lock and pin for actuating said bolt to operatively connect the said steering mechanism and wheel.

4. In a device of the class described, a steering mechanism wherein a spindle is employed, a sleeve keyed to said spindle, a cap secured to said sleeve and enclosing one end of said spindle, a steering wheel having a hub, the said hub having an open upper end, a locking device carried by said wheel and hub, a second sleeve encircling the first mentioned sleeve and positioned within said hub to be secured thereto by said locking device, and a cap secured to the second mentioned sleeve and closing the opening in said hub, said locking device providing means for operatively connecting said sleeves.

5. In a device of the character described, a steering mechanism wherein a spindle is employed, a sleeve keyed to said spindle, a steering wheel having a hub, a sleeve positioned within said hub encircling the first mentioned sleeve, a bolt casing having a slot connecting the outer sleeve to said hub, a lock carried by said wheel, a sliding bolt in said casing, a pin fixed to said bolt extending through said slot, and a connection between said lock and pin for actuating said bolt to operatively connect said sleeves.

JACOB R. GRIFFITH.